(12) United States Patent
Tanaka

(10) Patent No.: US 9,673,568 B2
(45) Date of Patent: Jun. 6, 2017

(54) PLUG CONNECTOR

(71) Applicant: HOSIDEN CORPORATION, Yao (JP)

(72) Inventor: Akihiro Tanaka, Yao (JP)

(73) Assignee: HOSIDEN CORPORATION, Yao-shi (JP)

( * ) Notice: Subject to any disclaimer, the term of this patent is extended or adjusted under 35 U.S.C. 154(b) by 0 days.

(21) Appl. No.: 14/861,052

(22) Filed: Sep. 22, 2015

(65) Prior Publication Data

US 2016/0093983 A1 Mar. 31, 2016

(30) Foreign Application Priority Data

Sep. 29, 2014 (JP) ................................. 2014-198874

(51) Int. Cl.
| | |
|---|---|
| *H01R 13/6593* | (2011.01) |
| *H01R 13/6581* | (2011.01) |
| *H01R 13/58* | (2006.01) |
| *G02B 6/42* | (2006.01) |

(52) U.S. Cl.
CPC ....... *H01R 13/6581* (2013.01); *H01R 13/582* (2013.01); *H01R 13/6593* (2013.01); *G02B 6/4284* (2013.01)

(58) Field of Classification Search
CPC .......................... H01R 13/6593; H01R 13/6581
USPC .................................. 439/607.55, 455, 452
See application file for complete search history.

(56) References Cited

U.S. PATENT DOCUMENTS

| | | | | | |
|---|---|---|---|---|---|
| 5,158,481 | A | * | 10/1992 | Frantz ................ | H01R 13/6581 439/607.58 |
| 5,725,395 | A | * | 3/1998 | Lee ...................... | H01R 13/504 439/108 |
| 6,200,162 | B1 | * | 3/2001 | Aoyama ................ | H01R 4/184 439/578 |
| 6,783,397 | B2 | * | 8/2004 | Yang Lee ............ | H01R 13/506 439/607.41 |

(Continued)

FOREIGN PATENT DOCUMENTS

| | | |
|---|---|---|
| EP | 2393167 A2 | 12/2011 |
| JP | H09-199230 | 7/1997 |

OTHER PUBLICATIONS

Extended European Search Report issued on Feb. 2, 2016 for the counterpart European patent application No. 15020171.3.

*Primary Examiner* — Tulsidas C Patel
*Assistant Examiner* — Marcus Harcum
(74) *Attorney, Agent, or Firm* — Kratz, Quintos & Hanson, LLP

(57) ABSTRACT

A plug connector including a connecting member, a cable, and a shield case. The cable includes a signal transmission part connected to the connecting member. The shield case includes first and second shells and a first retainer. The first and second shells are combined together in a first direction so as to form a tube at least partially covering the connecting member and the signal transmission part. The first shell has an end face on one side of a second direction. The second direction is orthogonal to the first direction. The first retainer is a tube or half tube for retaining the cable. The first retainer is provided on the second shell so as to be located on the one side of the second direction relative to the end face of the first shell and in contact with at least a part of the end face of the first shell.

20 Claims, 11 Drawing Sheets

(56) References Cited

U.S. PATENT DOCUMENTS

| | | | |
|---|---|---|---|
| 6,808,417 B2* | 10/2004 | Yoshida | H01R 9/0518 |
| | | | 439/585 |
| 7,066,768 B2* | 6/2006 | Kameyama | H01R 24/44 |
| | | | 439/568 |
| 7,878,855 B2* | 2/2011 | Li | H01R 13/65802 |
| | | | 439/607.04 |
| 7,955,132 B2* | 6/2011 | Luo | H01R 12/62 |
| | | | 439/607.41 |
| 8,870,596 B2* | 10/2014 | Ii | H01R 13/6581 |
| | | | 439/607.41 |
| 2008/0260334 A1 | 10/2008 | Sakaji et al. | |
| 2010/0151731 A1 | 6/2010 | Su et al. | |
| 2011/0201228 A1* | 8/2011 | Schumacher | H01R 13/4368 |
| | | | 439/374 |
| 2012/0064769 A1* | 3/2012 | Su | H01R 13/6581 |
| | | | 439/607.55 |
| 2014/0308848 A1* | 10/2014 | Shi | H01R 24/62 |
| | | | 439/607.55 |

\* cited by examiner

PLUG CONNECTOR

CROSS-REFERENCE TO RELATED APPLICATIONS

The present application claims priority under 35 U.S.C. §119 of Japanese Patent Application No. 2014-198874 filed on Sep. 29, 2014, the disclosure of which is expressly incorporated by reference herein in its entity.

BACKGROUND OF THE INVENTION

Technical Field

The invention relates to plug connectors.

Background Art

A conventional plug connector is disclosed in Japanese Unexamined Patent Publication No. 09-199230. The plug connector includes a housing, a plurality of terminals, a cable, and a shield case. The housing is made of an insulating resin. The terminals are held at intervals in the housing. The cable has a plurality of signal wires. An end portion of each signal wire protrudes from an end portion of the cable. The core wire at the end portion of each signal wire is soldered to one of the terminals. The shield case includes first and second shells and a retainer. The first and second shells are each a half tube and combined together to form a tube. The combined first and second shells houses the housing and the end portions of the signal wires. The retainer is a metal plate contiguous with the rear end of the first shell. The retainer curves in a tuboid shape along the outer periphery of the cable and is crimped so as to retain the end portion of the cable.

SUMMARY OF INVENTION

In the state where the above conventional plug connector is connected to a receptacle connector, the cable may be moved in a direction including a component of the connecting direction of the plug connector. The cable moved in this manner applies a load only on the area where the retainer retaining the cable is connected to the first shell. As a result, the conventional plug connector has a low durability.

In the above circumstances, the invention provides a plug connector with an improved durability.

A plug connector in an aspect of the invention includes a connecting member, a cable, and a shield case. The cable includes a signal transmission part connected to the connecting member. The shield case includes first and second shells and a first retainer. The first and second shells are combined together in a first direction so as to form a tube at least partially covering the connecting member and the signal transmission part. The first shell has an end face on one side of a second direction. The second direction is orthogonal to the first direction. The first retainer is a tube or half tube for retaining the cable. The first retainer is provided on the second shell so as to be located on the one side of the second direction relative to the end face of the first shell and in contact with at least a part of the end face of the first shell.

The plug connector of this aspect has an improved durability for the following reasons. When the cable is moved (pried) in a direction including a component of the other side of the second direction in a state where the plug connector is connected to the receptacle connector in the second direction (hereinafter referred to as a "connected state"), the first retainer is in contact with at least a part of the end face of the first shell. Accordingly, a load caused by moving the cable is also shared by the first shell.

The first shell may include a half tube extending in the second direction. The half tube of the first shell may include the end face, which may include a first part on one side of the first direction, a second part on one side of a third direction, and a third part on the other side of the third direction. The third direction may be orthogonal to the first direction and the second direction. The second shell may be a half tube or plate to be combined with the half tube of the first shell. The first retainer may be in contact with at least one of the first part, the second part, or the third part.

The plug connector of this aspect has an improved durability as detailed below. In a case (1) where the cable in the connected state is moved (pried) in a direction including components of the other side of the second direction and one side of the first direction, the first retainer is in contact with the first part of the end face of the first shell. Therefore, a load caused by moving the cable is also shared by the first retainer and the first shell. In a case (2) where the cable in the connected state is moved (pried) in a direction including components of the other side of the second direction and one side of the third direction in the connected state, the first retainer is in contact with the second part of the end face of the first shell. Therefore, a load caused by moving the cable is also shared by the first retainer and the first shell. In a case (3) where the cable in the connected state is moved (pried) in a direction including components of the other side of the second direction and the other side of the third direction, the first retainer is in contact with the third part of the end face of the first shell. Therefore, a load caused by moving the cable is also shared by the first retainer and the first shell.

The shield case may further include an engaging arm extending in the second direction from one of the first and second shells and a first engaging hole in the other one of the first and second shells. The first engaging hole may be configured to engage the engaging arm.

The plug connector of this aspect has a further improved durability and an improved tensile strength. This is because the engaging arm engages with the first engaging hole.

The engaging arm may be provided as a pair of engaging arms extending from one of the first and second shells so as to be opposed to each other in the third direction. The first engaging hole may be provided as a pair of first engaging holes in the other one of the first and second shells. The first engaging holes may be opposed to each other in the third direction. The engaging arms may be configured to engage in the respective first engaging holes from outside of the other shell.

The plug connector of this aspect includes further improved durability and tensile strength. This is because the pair of engaging arms engages with the pair of first engaging holes.

The shield case may further include a second engaging hole in one of the first and second shells and an engaging projection on the other one of the first and second shells. The engaging projection may be configured to engage in the second engaging hole.

The plug connector of this aspect includes further improved durability and tensile strength. This is because the engaging projection engages with the second engaging hole.

The second engaging holes may be provided as a pair of second engaging holes in one of the first and second shells. The second engaging holes may be opposed to each other in the third direction. The engaging projection may be provided as a pair of engaging projections on the other one of the first and second shells. The engaging projections may be opposed to each other in the third direction and configured to engage in the respective second engaging holes from the inside of the one shell.

The plug connector of this aspect includes further improved durability and tensile strength. This is because the pair of engaging projections engages with the pair of second engaging holes.

The shield case may further include a second retainer being a tube or half tube for retaining the cable. The second retainer may be provided in the first shell so as to be located on the one side of the second direction relative to the end face of the first shell.

The plug connector of this aspect has further improved durability and tensile strength. This is because the cable is retained by the second retainer as well as the first retainer retains the cable.

The first retainer may retain the cable over the second retainer.

The plug connector of this aspect includes further improved durability and tensile strength. This is because the second retainer retains the cable and the first retainer also retains the cable over the second retainer.

The plug connector of any one of the above aspects may further include a gasket of ring shape. The cable may be inserted through and in intimate contact with the gasket. The shield case may further include a third retainer being a tube or half tube for retaining the gasket. The third retainer may be coupled to the first shell so as to be located on the one side of the second direction relative to the end face of the first shell.

The plug connector of this aspect has further improved durability and tensile strength. This is because the third retainer retains the gasket in intimate contact with the cable.

The third retainer may be located on the one side of the second direction relative to the second retainer, not relative to the first shell.

The plug connector of this aspect has further improved durability and tensile strength. This is because not only the cable is retained by the first and the second retainer, but also the gasket in intimate contact with the cable is retained by the third retainer.

The connector of any one of the above aspects may further include a housing having an insulating property and holding the connecting member. The first and second shells may at least partially cover the connecting member, the housing, and the signal transmission part.

Figure 1A:
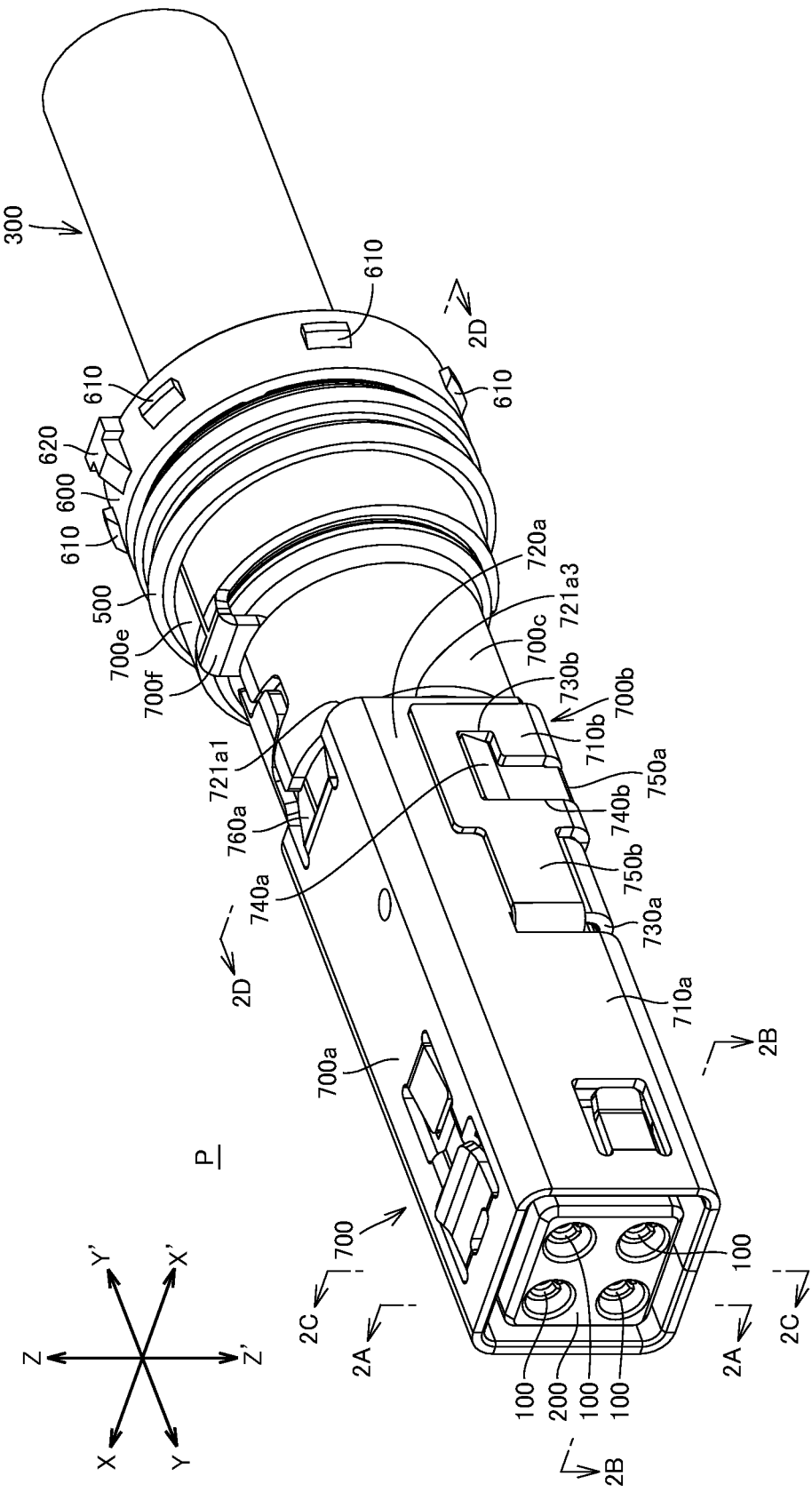
FIG. 1A is a front, top, left side perspective view of a connector in an embodiment of the invention, with a case omitted.
Figure 1B:
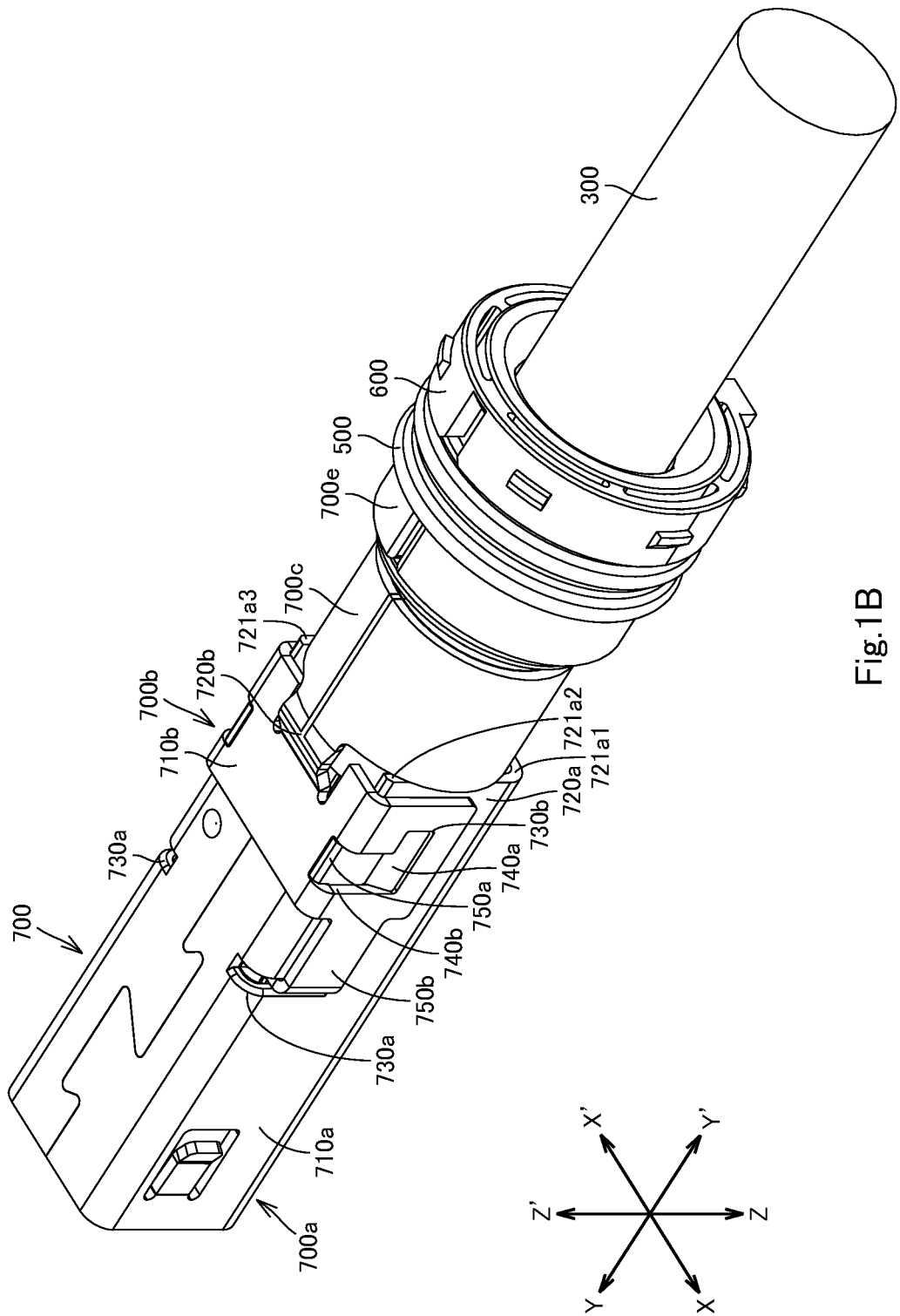
FIG. 1B is a back, bottom, right side perspective view of the connector with the case omitted.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the plug connector and its constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENT

A plug connector (hereinafter referred to as a plug P) in an embodiment of the invention will be described with reference to FIG. 1A to FIG. 6B. The plug P includes a plurality of terminals 100 (connecting member), a housing 200, a cable 300, a molded member 400, a gasket 500, a spacer 600, a shield case 700, and a case (not shown). These constituents of the plug P will be described below in detail. The Z-Z' direction indicated in FIG. 1A to FIG. 2A and FIG. 2C to FIG. 2D is the direction in which first and second shells 700*a*, 700*b* (to be described) of the shield case 700 are combined together. The Z-Z' direction corresponds to the "first direction," the Z direction to the "one side of the first direction," and the Z' direction to the "other side of the first direction" in the claims. The Y-Y' direction indicated in FIG. 1A to FIG. 2C is the lengthwise direction of the first and second shells 700*a*, 700*b* of the shield case 700 and also the direction in which the plug P is connected to a receptacle connector (not shown, hereinafter referred to as a "receptacle"). The Y-Y' direction is orthogonal to the Z-Z' direction. The Y-Y' direction corresponds to the "second direction," the Y direction to the "one side of the second direction," and the Y direction to the "other side of the second direction" in the claims. The X-X' direction indicated in FIG. 1A to FIG. 1B, FIG. 2B and FIG. 2D is the width direction of the first and second shells 700*a*, 700*b* of the shield case 700. The X-X' direction is orthogonal to the Z-Z' direction and the Y-Y' direction (crosses the Z-Z' direction and the Y-Y' direction at right angles). The X-X' direction corresponds to the "third direction," the X direction to the "one side of the third direction," and the X' direction to the "other side of the third direction" in the claims.

Figure 3:
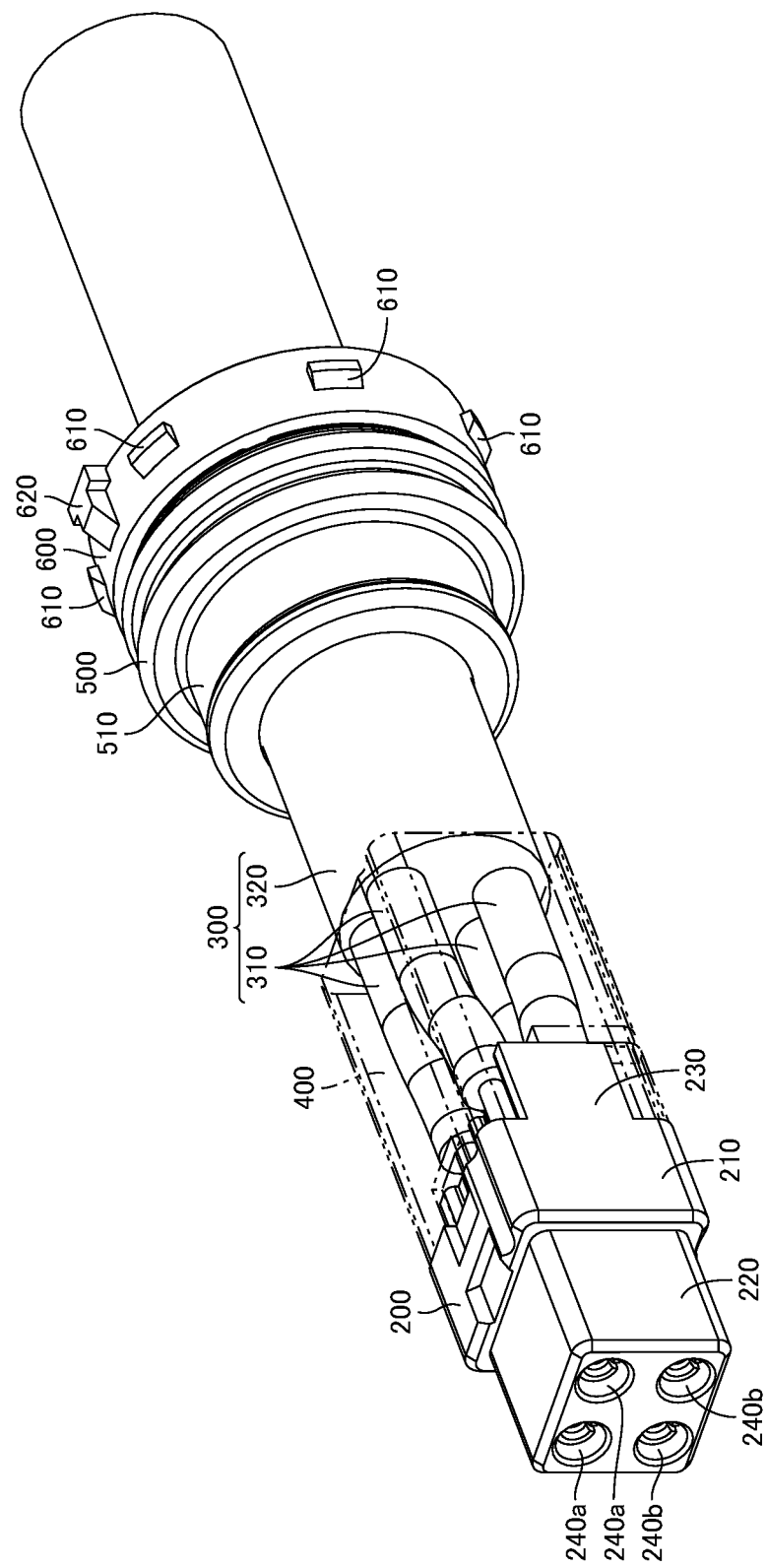
FIG. 3 is a front, top, left side perspective view of a housing, a molded member, a cable, a gasket, and a spacer of the connector, with the molded member illustrated as an see-through element.
Figure 4A:
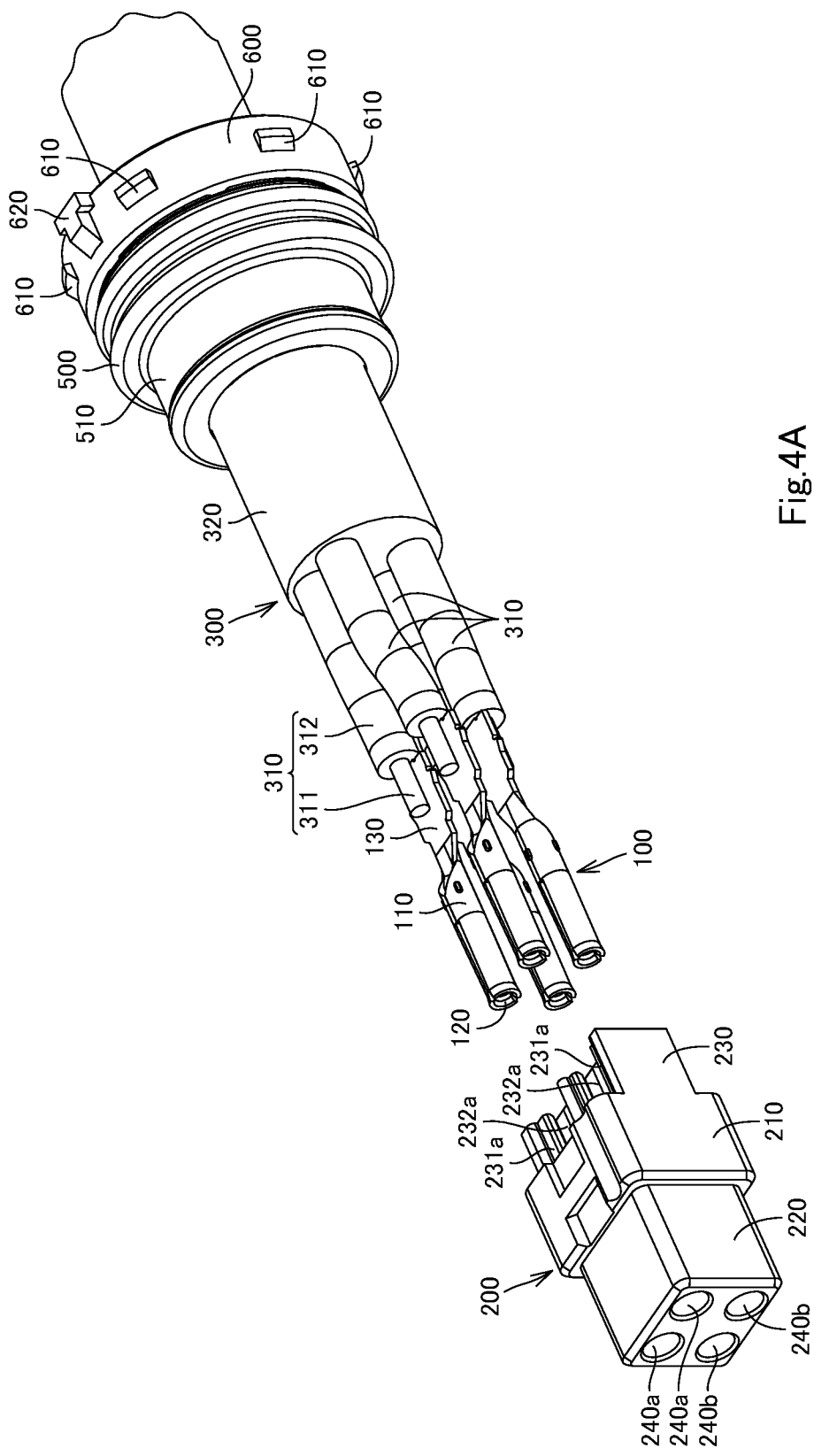
FIG. 4A is an exploded perspective view of the housing, terminals, and the cable of the connector as viewed from front, top, and left side.
Figure 4B:
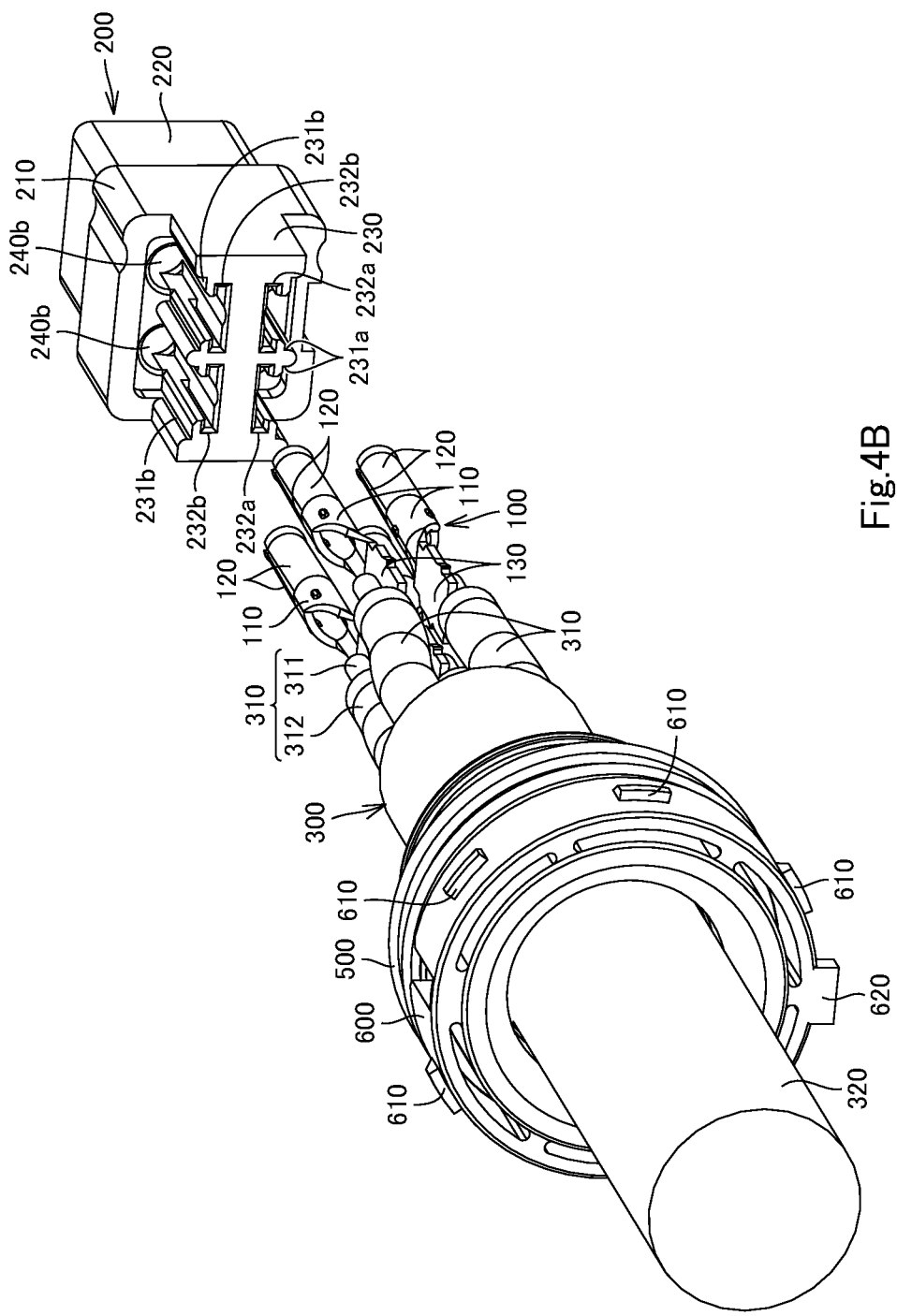
FIG. 4B is an exploded perspective view of the housing, the terminals, and the cable of the connector as viewed from back, bottom, and left side.

As best illustrated in FIG. 3 to FIG. 4B, the housing 200 is made of an insulating resin. The housing 200 includes a middle portion 210, a distal portion 220, a basal portion 230, a plurality of receiving holes 240a, and a plurality of receiving holes 240b.

Figure 2A:
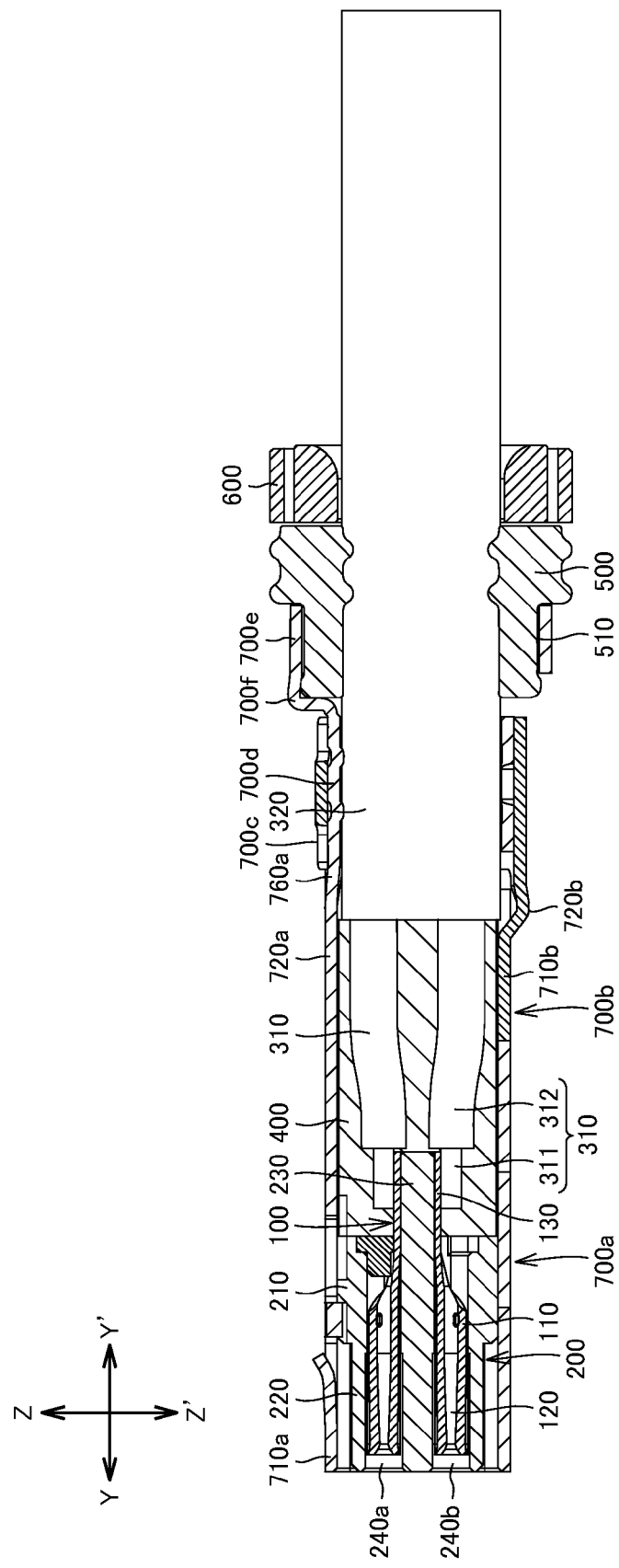
FIG. 2A is a sectional view of the connector taken along 2A-2A in FIG. 1A, with the internal structure of the cable omitted.
Figure 2B:
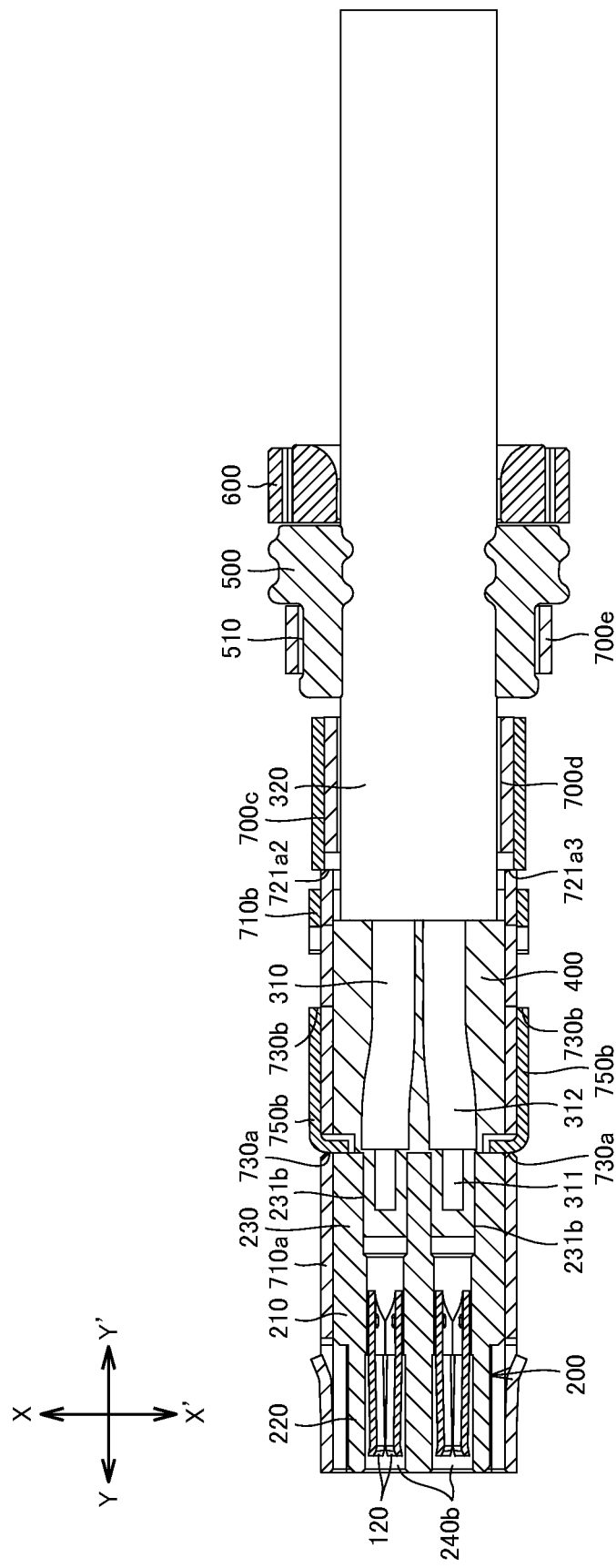
FIG. 2B is a sectional view of the connector taken along 2B-2B in FIG. 1A, with the internal structure of the cable being omitted.
Figure 2C:
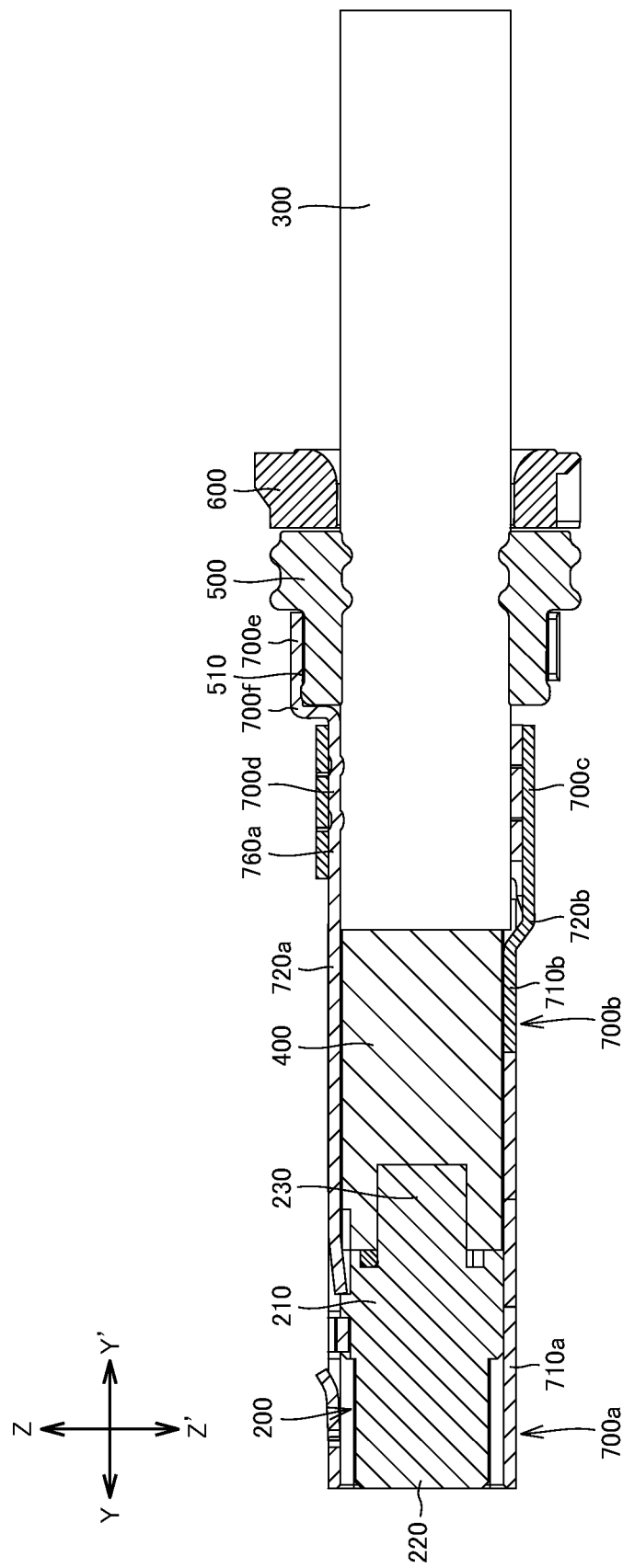
FIG. 2C is a sectional view of the connector taken along 2C-2C in FIG. 1A, with the internal structure of the cable being omitted.
Figure 2D:
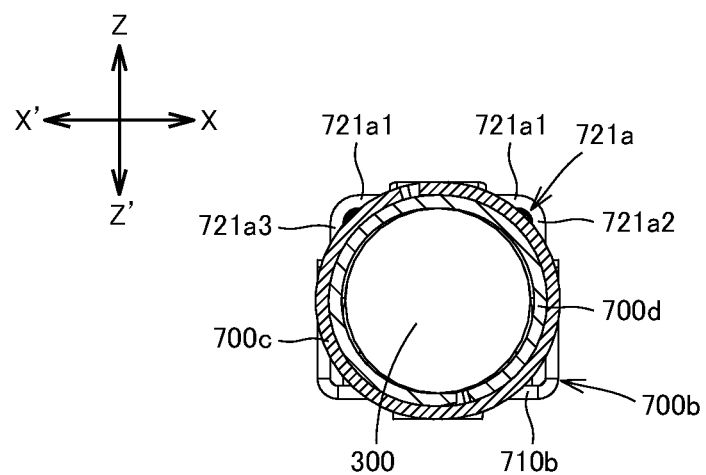
FIG. 2D is a sectional view of the connector taken along 2D-2D in FIG. 1A, with the internal structure of the cable being omitted.

The middle portion 210 is a block of rectangular cuboid shape. The distal portion 220 is a block of rectangular cuboid shape, extending in the Y direction from the Y-direction end face of the middle portion 210. The distal portion 220 is smaller in the Z-Z' direction and in the X-X' direction than the middle portion 210. The distal portion 220 serves as the connecting part of the plug P to fit in a connecting hole of the receptacle. The receiving holes 240a are spaced from each other in the X-X' direction and extend in the Y-Y' direction in the Z-direction portion of the middle portion 210 and the distal portion 220. The receiving holes 240b are spaced from each other in the X-X' direction and extend in the Y-Y' direction in the Z' direction portion of the middle portion 210 and the distal portion 220. As best illustrated in FIG. 2A, the receiving holes 240a, 240b extend in the Y-Y' direction through the middle portion 210 and the distal portion 220.

As illustrated in FIG. 3 to FIG. 4B, the basal portion 230 is a rectangular plate extending in the Y' direction from the Y'-direction face of the middle portion 210. The basal portion 230 is smaller in the Z-Z' direction than the middle portion 210 and than the distal portion 220 and is as large in the X-X' direction as the middle portion 210. The basal portion 230 includes a pair of connecting grooves 231a, a pair of connecting grooves 231b, a pair of press-fit holes 232a, and a pair of press-fit holes 232b.

As best illustrated in FIG. 4B, the connecting grooves 231a are provided in the Z-direction face of the basal portion 230 and are spaced from each other in the X-X' direction. The connecting grooves 231a extend in the Y-Y' direction, open at its Z-direction and Y'-direction sides, and communicate with the respective receiving holes 240a. The connecting grooves 231b are provided in the Z'-direction face of the basal portion 230 and are spaced from each other in the X-X' direction. The connecting grooves 231b extend in the Y-Y' direction, open at its Z'-direction and Y'-direction sides, and communicate with the respective receiving holes 240b.

The press-fit holes 232a are provided on the Z' direction side relative to the connecting grooves 231a of the basal portion 230. The press-fit holes 232a extend in the Y-Y' direction and open at its Y'-direction side. The press-fit holes 232a communicate with the respective receiving holes 240a and the respective connecting grooves 231a. The press-fit hole 232a is larger in the X-X' direction than the connecting groove 231a. The press-fit holes 232b are provided on the Z-direction side relative to the connecting grooves 231b of the basal portion 230. The press-fit holes 232b extend in the Y-Y' direction and open at its Y'-direction side. The press-fit holes 232b communicate with the respective receiving holes 240b and the respective connecting grooves 231b. The press-fit hole 232b is larger in the X-X' direction than the connecting groove 231b.

As best illustrated in FIG. 4A to FIG. 4B, each terminal 100 is formed of a metal plate. Each terminal 100 includes a middle portion 110, a pair of contact portions 120, and a connecting portion 130. The middle portion 110 is a plate curved in a circular tube. The contact portions 120 are plates of half-tube shape extending in the Y direction from the respective Y-direction end faces of the middle portions 110 and being opposed to each other in the X-X' direction. The connecting portion 130 is a generally rectangular flat plate extending in the Y' direction from the Y'-direction end face of the middle portion 110. The connecting portion 130 is slightly larger in the X-X' direction than any press-fit hole 232a or 232b of the housing 200.

With regard to two of the four terminals 100, the middle portions 110 and the contact portions 120 are received in the respective receiving holes 240a of the housing 200, and the connecting portions 130 are press-fitted in the respective press-fit holes 232a of the housing 200. With regard to the other two terminals 100, the middle portions 110 and the contact portions 120 are received in the respective receiving holes 240b of the housing 200, and the connecting portions 130 of the terminals are press-fitted in the respective press-fit holes 232b of the housing 200. The two terminals 100 and the other two terminals 100 are symmetrically arranged in the Z-Z' direction.

In use, when the distal portion 220 of the housing 200 is connected into the connecting hole of the receptacle, pins of the receptacle are inserted through the receiving holes 240a, 240b and then inserted between the contact portions 120 of the terminals 100. This brings the contact portions 120 respectively into elastic contact with the pins of the receptacle. This establishes connection between the plug P and the receptacle.

As best illustrated in FIG. 4A and FIG. 4B, the cable 300 includes a plurality of signal wires 310 (signal transmission part), a shield conductor (not shown), and an outer insulator 320. The signal wires 310 each include a core wire 311 and an inner insulator 312. The inner insulator 312 is a tuboid insulator covering the core wire 311. The shield conductor is a tuboid conductor covering all the signal wires 310. The outer insulator 320 is a tuboid insulator covering the shield conductor. The outer insulator 320 and the shield conductor are cut off at their Y-direction end portions to allow the signal wires 310 to protrude in the Y direction from the outer insulator 320 and the shield conductor. These protruding portions will be hereinafter referred to as protruding portions of the signal wires 310. In the protruding portions of the signal wires 310, the Y-direction end portions of the inner insulators 312 are cut off to allow the core wires 311 to protrude in the Y direction. These protruding portions will be hereinafter referred to as protruding portions of the core wires 311. With regard to two of the signal wires 310, the protruding portions of the core wires 311 are received in the respective connecting grooves 231a of the housing 200 and soldered to the respective connecting portions 130 of the two terminals 100 on the Z-direction side (see FIG. 2A). With regard to the other two signal wires 310, the protruding portions of the core wires 311 are received in the respective connecting grooves 231b of the housing 200 and soldered to the respective connecting portions 130 of the two terminals 100 on the Z'-direction side (see FIG. 2A). For convenience of illustration, details of the sectional view of the cable 300 are not depicted in FIG. 2A to FIG. 2D.

The molded member 400 is an insulating resin molded article and fixed to the basal portion 230 of the housing 200. The basal portion 230 of the housing 200, the connecting portions 130 of the terminals 100, and the protruding portions of the signal wires 310 of the cable 300 are embedded in the molded member 400. In other words, the molded member 400 is in intimate contact with the basal portion 230 of the housing 200, the connecting portions 130 of the terminals 100, and the protruding portions of the signal wires 310 of the cable 300.

The gasket 500 is a ring-shaped elastic body made of silicone rubber or the like material. The gasket 500 has an inner diameter that is slightly smaller than the outer diameter of the outer insulator 320 of the cable 300. The cable 300 is received through the gasket 500, so that the gasket 500 is in intimate contact with the outer insulator 320 of the cable 300. The gasket 500 is provided with a ring-shaped fitting recess 510 along its outer peripheral face.

The spacer 600 is a circular tube made of an insulating resin. The spacer 600 has an inner diameter that is larger than the outer diameter of the outer insulator 320 of the cable 300. The cable 300 is received through the spacer 600. The spacer 600 is located on the Y' direction side relative to the gasket 500. A plurality of engaging projections 610 are provided at intervals circumferentially along the outer peripheral face of the spacer 600. The outer peripheral face of the spacer 600 is also provided with a guide protrusion 620 in an area thereof between two adjacent engaging projections 610.

The shield case 700 includes a first shell 700a, a second shell 700b, a first retainer 700c, a second retainer 700d, a third retainer 700e, and a coupling portion 700f. The first shell 700a, the second retainer 700d, the third retainer 700e, and the coupling portion 700f are formed of a single metal plate. The second shell 700b and the first retainer 700c are formed of a single metal plate.

Figure 5A:
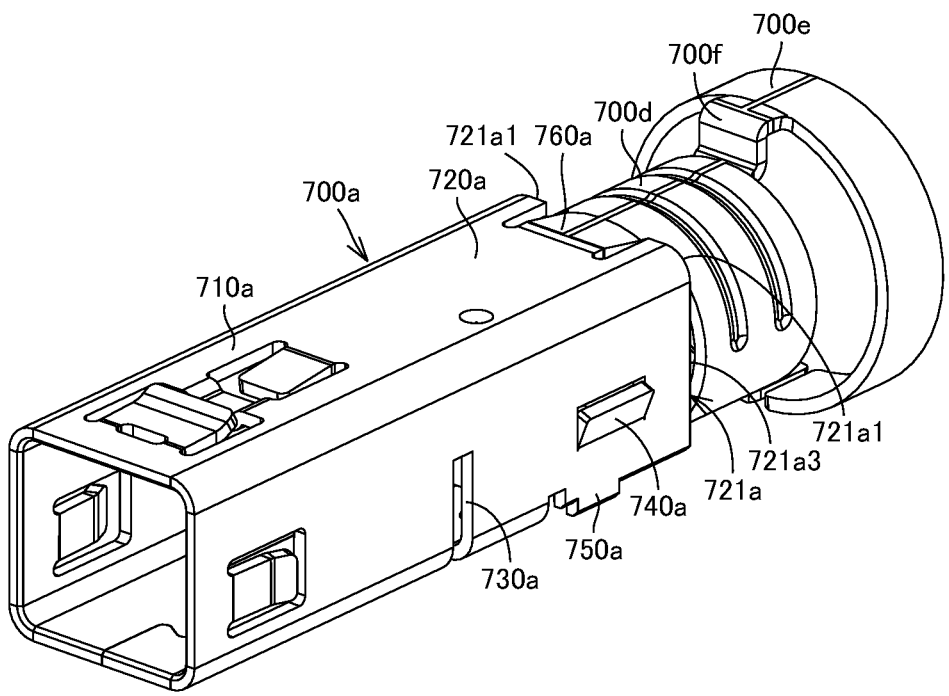
FIG. 5A is a front, top, left side perspective view of a first shell, a second retainer, a third retainer, and a coupling portion of a shield case of the connector.
Figure 5B:
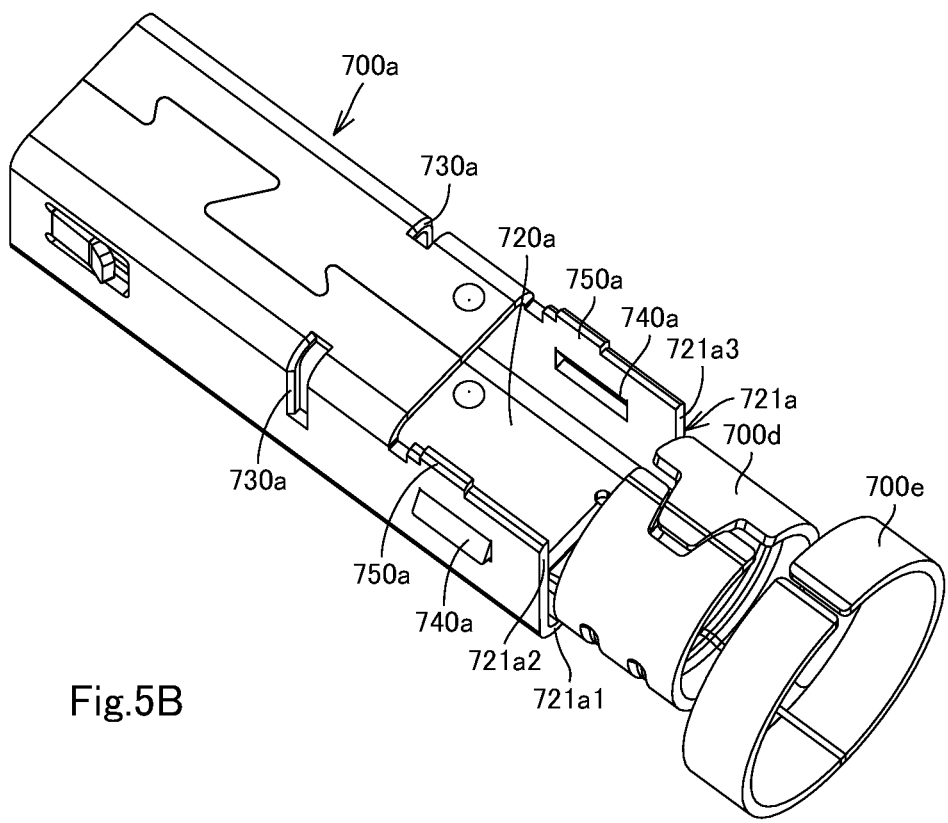
FIG. 5B is a back, bottom, right side perspective view of the first shell, the second retainer, the third retainer, and the coupling portion of the shield case of the connector.

As best illustrated in FIG. 5A and FIG. 5B, the first shell 700a includes a tube 710a, a half tube 720a, a pair of engaging holes 730a (first engaging hole), a pair of engaging projections 740a, a pair of legs 750a, and a coupling portion 760a.

The half tube 720a is a half of a rectangular tube, extending in the Y-Y' direction and opening at its Z'-direction side. The half tube 720a includes a Z-direction-side plate, an X-direction-side lateral plate, an X'-direction-side lateral plate, and a Y'-direction end face 721a. The X-direction-side lateral plate extends in the Z' direction from the X-direction end of the Z-direction-side plate. The X'-direction-side lateral plate extends in the Z' direction from the X'-direction end of the Z-direction-side plate. The distance in the X-X' direction between the inner faces of these lateral plates is substantially equal to the X-X' direction dimension of the molded member 400. The half tube 720a fits over the portion of the molded member 400 other than the portion fixed to the basal portion 230 (see FIG. 2A to FIG. 2C).

The Z-direction-side plate, the X-direction-side lateral plate, and the X'-direction-side lateral plate of the half tube 720a have respective Y'-direction end faces, which constitute the Y'-direction end face 721a of the half tube 720a. The end face 721a includes a first part 721a1, a second part 721a2, and a third part 721a3. The first part 721a1 is the Z-direction-side part of the end face 721a, i.e. the Y'-direction end of the Z-direction-side plate. The second part 721a2 is the X-direction-side part of the end face 721a, i.e. the Y'-direction end of the X-direction-side lateral plate. The third part 721a3 is the X'-direction-side part of the end face 721a, i.e. the Y'-direction end of the X'-direction-side lateral plate.

The tube 710a is a rectangular tube extending from the half tube 720a in the Y direction. The tube 710a has an inner shape corresponds to the outer shape of the middle portion 210 of the housing 200. The tube 710a houses the distal portion 220 of the housing 200 with a clearance therebetween. The tube 710a also fits over the middle portion 210 of the housing 200, the basal portion 230 of the housing 200, and the portion of the molded member 400 fixed to the basal portion 230 (see FIG. 2A to FIG. 2C).

The tube 710a includes a Z-direction-side top plate, a Z'-direction-side bottom plate, an X-direction-side lateral plate, and an X'-direction-side lateral plate. The X-direction-side lateral plate joins the X-direction end of the top plate to the X-direction end of the bottom plate. The X'-direction-side lateral plate joins the X'-direction end of the top plate to the X'-direction end of the bottom plate.

The engaging holes 730a are slits, one of which extends in the X-direction end portion of the bottom plate and the Z'-direction-side portion of the X-direction-side lateral plate of the tube 710a. The other slit extends in the X'-direction end portion of the bottom plate and the Z'-direction-side portion of the X'-direction-side lateral plate of the tube 710a. The engaging holes 730a are opposed to each other in the X-X' direction.

The engaging projections 740a are plate-like portions of the lateral plates of the half tube 720a that are cut and bend outward. The engaging projections 740a are opposed to each other in the X-X' direction. The legs 750a are projections protruding from the Z'-direction ends of the lateral plates of the half tube 720a. The coupling portion 760a is centrally provided on the Y'-direction end of the Z-direction-side plate of the half tube 720a. The coupling portion 760a is a plate extending in the Y-Y' direction.

The second retainer 700d is a plate contiguous with the coupling portion 760a of the first shell 700a and is located on the Y' direction side relative to the end face 721a of the half tube 720a. The second retainer 700d curves in a circular tube shape along the outer periphery of the cable 300 to form a circular tube. The second retainer 700d retains the cable 300 so as to be in contact with the shield conductor (see FIG. 2A to FIG. 2D). In other words, the cable 300 is received in and retained by the second retainer 700d.

The third retainer 700e is a plate joined to the second retainer 700d by the coupling portion 700f so as to be on the Y' direction side relative to the second retainer 700d. The third retainer 700e curves in a circular tube shape along the ring-shaped bottom of the fitting recess 510 of the gasket 500 to form a circular tube. The third retainer 700e fits in the fitting recess 510 of the gasket 500 so as to retain the gasket 500 (see FIG. 2A to FIG. 2C). The coupling portion 700f is a plate that joins the top portion of the second retainer 700d to the top portion of the third retainer 700e.

Figure 6A:
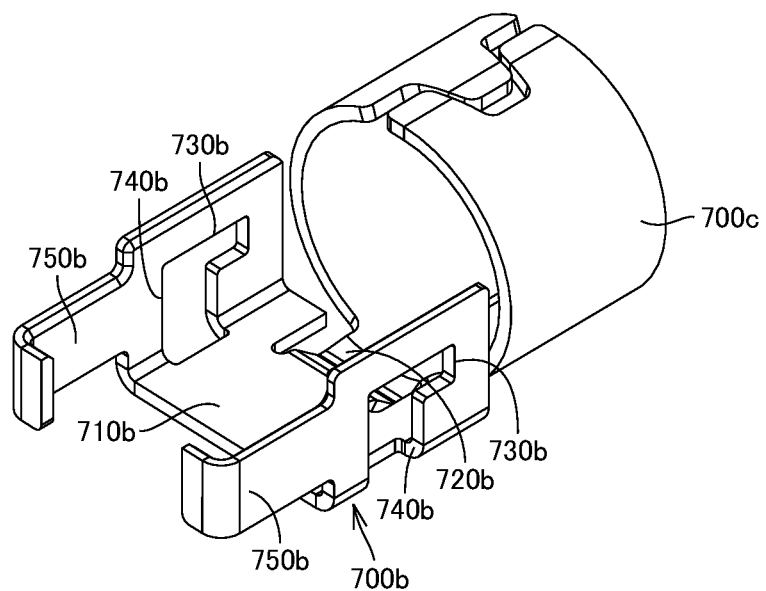
FIG. 6A is a front, top, left side perspective view of a second shell and a first retainer of the shield case of the connector.
Figure 6B:
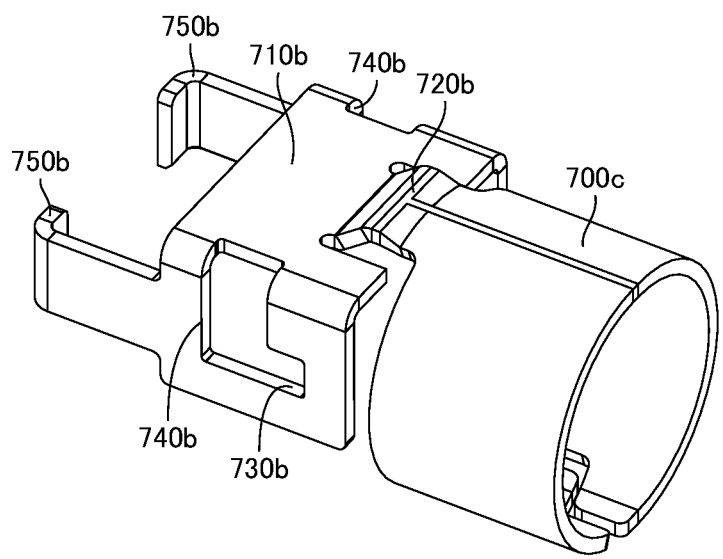
FIG. 6B is a back, bottom, right side perspective view of the second shell and the first retainer of the shield case of the connector.

As best illustrated in FIG. 6A and FIG. 6B, the second shell 700b is a half tube to be combined with the half tube 720a of the first shell 700a in the Z-Z' direction. The second shell 700b includes a shell body 710b, a coupling portion 720b, a pair of engaging holes 730b (second engaging hole), a pair of engaging holes 740b, and a pair of engaging arms 750b.

The shell body 710b is a half tube. The shell body 710b includes a Z'-direction-side plate, an X-direction-side lateral plate, and an X'-direction-side lateral plate. The X-direction-side lateral plate extends in the Z direction from the X-direction end of the Z'-direction-side plate. The X'-direction-side lateral plate extends in the Z direction from the X'-direction end of the Z'-direction-side plate. The distance in the X-X' direction between the inner faces of these lateral side plates is substantially equal to the X-X' direction distance between the outer faces of the lateral plates of the half tube 720a of the first shell 700a. The lateral plates of the shell body 710b are in contact with the outer faces of the lateral plates of the half tube 720a, and the Z'-direction-side plate of the shell body 710b closes the opening on Z'-direction side of the half tube 720a, so that the shell body 710b is combined with the half tube 720a of the first shell 700a in the Z-Z' direction. The first and second shells 700a, 700b as combined constitute a tube to cover the terminals 100, the housing 200, the protruding portions of the signal wires 310 of the cable 300, and the molded member 400. The axial direction of the tube is the Y-Y' direction.

The engaging holes 730b are through holes respectively made in the lateral plates of the shell body 710b and opposed to each other in the X-X' direction. The engaging holes 730b are of shapes corresponding to the respective outer shapes of the engaging projections 740a of the first shell 700a. The engaging projections 740a engage with the respective engaging holes 730b from the inside of the shell body 710b. The engaging holes 740b are through holes in the lateral plates of the shell body 710b, on the Z'-direction side relative to the engaging holes 730b. The engaging holes 740b generally extend in the Z-Z' direction and extends a little further to the X- and X'-direction end portions of the Z'-direction-side plate of the shell body 710b. The engaging holes 740b each has a Y-Y' direction dimension substantially equal to or slightly larger than the Y-Y' direction dimension of each leg 750a of the first shell 700a. The legs 750a engage in the respective engaging holes 740b.

The engaging arms 750b are plates extending in the Y direction from the respective lateral plates of the shell body 710b so as to be opposed to each other in the X-X' direction. The engaging arms 750b are bent inwards at their free ends on the Y-direction-side. The free ends of the engaging arms 750b engage in the respective engaging holes 730a of the first shell 700a from the outside of the first shell 700a.

The coupling portion 720b is centrally provided on the Y'-direction end of the Z'-direction-side plate of the shell body 710b. The coupling portion 720b is a plate extending in the Y-Y' direction.

The first retainer 700c is a plate contiguous with the coupling portion 720b of the second shell 700b and located on the Y' direction side relative to the end face 721a of the first shell 700a. The first retainer 700c curves in a circular tube shape along the outer face of the second retainer 700d to form a circular tube. The first retainer 700c retains the second retainer 700d, i.e. retains the cable 300 over the second retainer 700d. The first retainer 700c has an inner diameter such as to allow the first retainer 700c to contact with the first part 721a1, the second part 721a2, and the third part 721a3 of the end face 721a of the first shell 700a. Accordingly, the first retainer 700c is in contact with the first part 721a1, the second part 721a2, and the third part 721a3 of the end face 721a of the first shell 700a. The first retainer 700c, by way of the contact with the second retainer 700d, is electrically connected to the shield conductor of the cable 300.

The case is made of an insulating resin. The case has a housing hole to house the terminals 100, the housing 200, the Y-direction end portion of the cable 300, the molded member 400, the gasket 500, the spacer 600, and the shield case 700. An inner wall of the housing hole of the case has a guide recess corresponding to the guide protrusion 620 of the spacer 600. The guide recess extends in the Y-Y' direction. The inner wall of the housing hole also has engaging recesses at positions corresponding to the engaging projections 610 of the spacer 600. The engaging recesses engage with the engaging projections 610 so as to fix the spacer 600 to the case.

The plug P configured as described above may be assembled in the following steps. First, the terminals 100 and the housing 200 are prepared. The contact portions 120 and the middle portions 110 of the terminals 100 are inserted into the receiving holes 240a, 240b of the housing 200 from the Y'-direction side. Then, the contact portions 120 and the middle portions 110 of the terminals 100 are housed in the receiving holes 240a, 240b, and the connecting portions 130 are press-fitted into the connecting grooves 231a, 231b of the housing 200. The terminals 100 are thus held in the housing 200.

The cable 300 and the spacer 600 are also prepared. The Y-direction end portion of the cable 300 is inserted through the spacer 600. The gasket 500 is prepared, and the Y-direction end of the cable 300 is inserted through the gasket 500. The gasket 500 now fittingly engages over the cable 300 and is located on the Y-direction side relative to the spacer 600.

After that, the protruding portions of the core wires 311 of the signal wires 310 of the cable 300 are inserted into the respective connecting grooves 231a, 231b of the housing 200 and brought into contact with the connecting portions 130 of the terminals 100. Then, the protruding portions of the core wires 311 are soldered to the respective connecting portions 130. Next, the basal portion 230 of the housing 200 and the protruding portions of the signal wires 310 of the cable 300 are placed into a mold (not shown). Resin material is injected into the mold, and the hardened resin becomes the molded member 400. The basal portion 230 and the protruding portions of the signal wires 310 of the cable 300 are thus insert molded in the molded member 400, and the molded member 400 is fixed to the basal portion 230.

Also prepared are the first shell 700a, the second retainer 700d, the third retainer 700e, and the coupling portion 700f by stamping a single metal plate. At this stage, the second retainer 700d and the third retainer 700e are planer and not shaped in a circular tube. The housing 200 and the molded member 400 are inserted into the first shell 700a, resulting in the following arrangements 1) to 3): 1) The distal portion 220 of the housing 200 is disposed in the tube 710a of the first shell 700a with a clearance therebetween. 2) The middle portion 210 and the basal portion 230 of the housing 200, and the portion of the molded member 400 fixed to the basal portion 230 are fitted into the tube 710a. 3) The remaining portion of the molded member 400 is covered with the half tube 720a of the first shell 700a.

Next, the second retainer 700d is curved into a circular tube shape along the outer periphery of the cable 300. The second retainer 700d is then crimped so as to retain the cable 300. The second retainer 700d is also brought into contact with and electrically connected to the shield conductor of the cable 300. Then, the third retainer 700e is curved into a circular tube shape along the bottom of the fitting recess 510 of the gasket 500. The third retainer 700e is then crimped so as to retain the gasket 500.

The second shell 700b and the first retainer 700c are also prepared by stamping a single metal plate. At this stage, first retainer 700c is planer and not shaped in a circular tube. The second shell 700b is combined with the first shell 700a in the Z-Z' direction. The second shell 700b is now placed over the half tube 720a of the first shell 700a and closes the opening of the half tube 720a. The attachment of the second shell 700b to the first shell 700a results in following arrangements 1) to 3): 1) The engaging arms 750b of the second shell 700b are inserted into and engaged with the respective engaging holes 730a of the first shell 700a from the Z' direction side. 2) The engaging projections 740a of the first shell 700a are inserted into and engaged with the respective engaging holes 730b of the second shell 700b. 3) The legs 750a of the first shell 700a are inserted into and engaged with the respective engaging holes 740b of the second shell 700b.

Next, the first retainer 700c is curved into a circular tube shape along the outer circumference of the second retainer 700d. The first retainer 700c is then crimped and thereby retains the second retainer 700d. In other words, the first retainer 700c retains the cable 300 over the second retainer 700d. The first retainer 700c is also brought into contact with the first part 721a1, the second part 721a2, and the third part 721a3 of the Y'-direction end face 721a of the first shell 700a. The case is also prepared, into the housing hole of which housed are the terminals 100, the housing 200, the Y-direction end portion of the cable 300, the molded member 400, the gasket 500, the spacer 600, and the shield case 700. The spacer 600 is fixed to the case. The plug P is now completely assembled.

The plug P has at least the following technical features and effects. First, the plug P has an improved durability of for the following reasons. In a case (1) where the cable 300 is moved (pried) in the Y direction in a state where the plug P is connected to the receptacle (hereinafter referred to as a "connected state"), a load caused by moving the cable 300 is also shared by the first shell 700a and the first retainer 700c. This is because the first retainer 700c retaining the cable 300 is in contact with the first part 721a1, the second part 721a2, and the third part 721a3 of the Y'-direction end face 721a of the first shell 700a. In a case (2) where the cable 300 in the connected state is moved (pried) in a direction including components of the Y and Z directions, a load caused by moving the cable 300 is also shared by the first shell 700a and the first retainer 700c. This is because the first retainer 700c retaining the cable 300 is in contact with the first part 721a1 on the Z-direction side of the end face 721a of the first shell 700a. In a case (3) where the cable 300 in the connected state is moved (pried) in a direction including components of the Y and X directions, a load caused by moving the cable 300 is also shared by the first shell 700a and the first retainer 700c. This is because the first retainer 700c retaining the cable 300 is in contact with the second part 721a2 on X-direction side of the end face 721a of the first shell 700a. In a case (4) where the cable 300 in the connected state is moved (pried) in a direction including components of the Y and X' directions, a load caused by moving the cable 300 is also shared by the first shell 700a and the first retainer 700c. This is because the first retainer 700c retaining the cable 300 is in contact with third part 721a3 on the X'-direction side of the end face 721a of the first shell 700a. Moreover, the engaging arms 750b of the second shell 700b engage with the engaging holes 730a of the first shell 700a from the outside, the engaging projections 740a of the first shell 700a engage with the engaging holes 730b of the second shell 700b from the inside, and the legs 750a of the first shell 700a engage with the engaging holes 740b of the second shell 700b. Since the first and second shells 700a, 700b are thus fixed to each other, the load caused by moving the cable 300 in any of the cases (1) to (4) described above can be also shared by the first and second shells 700a, 700b. Further, the cable 300 is retained by the second retainer 700d, and the gasket 500 fitting over the cable 300 is retained by the third retainer 700e. Accordingly, the load caused by moving the cable 300 in any of the cases (1) to (4) described above can be also shared by the second retainer 700d and the third retainer 700e.

Second, the plug P has an improved tensile strength for the following reasons. The cable 300 is retained by the first retainer 700c and the second retainer 700d, and the gasket 500 fitting over the cable 300 is retained by the third retainer 700e. Moreover, the first and second shells 700a, 700b are fixed to each other as described above.

Third, the crimping work of the first retainer 700c can be facilitated. As described above, the load caused by moving the cable 300 is also shared by the first and second shells 700a, 700b, the first retainer 700c, the second retainer 700d, and the third retainer 700e. Therefore, there is no need to take measures to bear the load, such as increasing the thickness of the first retainer 700c and the coupling portion 720b. Accordingly, the first retainer 700c can be manually crimped. As is obvious, the first retainer 700c may be crimped with a crimping device.

Fourth, the cable 300 is unlikely to slide in the Y direction relative to the first and second retainers 700c, 700d. If the plug connector P was designed such that the first retainer and the Y'-direction end of the first shell are arranged with a gap therebetween, by moving the cable 300 as in one of the cases (1) to (4) described above and reversely moving it, the first retainer would repeatedly move with respect to the first shell in the Y-Y' direction, which may cause the cable held by the first retainer to slide in the Y-Y' direction relative to the first retainer. However, the plug connector P is actually designed such that the first retainer 700c is in contact with the Y'-direction end face 721a of the first shell 700a as described above. It is therefore possible to prevent the first retainer 700c from moving the Y direction with respect to the first shell 700a, making it unlikely that the cable 300 will slide in the Y direction relative to the first and second retainers 700c, 700d.

The plug connector of the invention is not limited to the embodiment described above but may be modified in any manner within the scope of the claims. Specific modifications will be described in detail below.

The cable of the invention may any cable including the signal transmission part. For example, the cable may be a cable with at least one core wire, such as a coaxial cable. The cable may be an optical fiber cable, which includes at least one optical fiber serving as the signal transmission part.

The connecting member of the invention may be any member connectable to the cable of any one of the above aspects. For example, the connecting member may be a terminal or terminals, a circuit board, or a photoelectric conversion device or devices. The terminal(s) may be connected directly to the core wire(s) of the cable of any one of the above aspects. The circuit board includes at least one first electrode for connection with the protruding portions of the core wires of the signal wires of the cable. The circuit board may include a second electrode or electrodes connectable to a terminal or terminals of the receptacle connector. The circuit board may include a terminal or terminals connectable to a terminal or terminals or a pin or pins of a receptacle connector. The photoelectric conversion device(s) is mounted on a circuit board and optically coupled to an optical fiber or fibers of an optical fiber cable. The photoelectric conversion device converts optical signals transmitted via an optical fiber into electric signals and outputs the signals to a transmission path of the circuit board, and/or converts electric signals transmitted via a transmission path of the board into optical signals and outputs them to an optical fiber.

The housing of the invention may be omitted. The housing of the invention may be any insulating housing adapted to hold at least the connecting member of any one of the above aspects. For example, the housing may be a molded resin in which the connecting member of any one of the above aspects is insert-molded.

The molded member, the gasket, and/or the spacer of the invention may be omitted. The gasket of the invention may be any ring-shaped elastic body adapted to receive and make intimate contact with the cable of any one of the above aspects.

The shield case of the invention may be modified in any manner as long as it includes the first and second shells and the first retainer in the embodiment or of any one of the following aspects. The first and second shells of the invention may be modified in any manner as long as they can be combined together in the first direction to form a tube at least partially covering the connecting member and the signal transmission part of any one of the above aspects, and as long as the first shell includes an end face on the one side of the second direction orthogonal to the first direction.

For example, the first shell of the invention may be a plate extending in the second direction, generally shaped in a flat shape or in a U shape, V shape, or arc shape in sectional view, and including an end face on one side of the second direction. The first shell of the invention may alternatively be a half tube (half circular tube or half polygonal tube) extending in the second direction and having an end face on the one side of the second direction. The first shell of the invention may alternatively include a half tube (half circular tube or half polygonal tube) and a tube (circular tube or polygonal tube), both of which extend in the second direction and one of has an end face on the one side of the second direction. The half tube and the tube may be different in the dimension in the first direction and/or the dimension in the third direction crossing the first and second directions. The end face on the one side of the second direction of any one of the above aspects may have a first part on the one side of the first direction, a second part on one side of the third direction, and a third part on the other side of the third direction.

The second shell of the invention may be a plate extending in the second direction, generally shaped in a flat shape or in a V shape, or arc shape in sectional view, and adapted to be combined with the first shell in the first direction to close the opening of the half tube of the first shell so that the first and second shells form a tube. The second shell of the invention may alternatively be a half tube (half circular tube or half polygonal tube) extending in the second direction. The half tube of the second shell may be combined with the above-described plate of the first shell in the first direction to close the opening of the half tube of the second shell so that the first and second shells form a tube. The half tube of the second shell may alternatively be combined with the half tube of the first shell in the first direction so that the first and second shells form a tube.

The first retainer of the invention may be any tube (circular tube or polygonal tube) or half tube (half circular tube or half polygonal tube) for retaining the cable, the first retainer being provided on the second shell of any one of the above aspects so as to be located on the one side of the second direction relative to the end face of the first shell and in contact with at least a part of the end face of the first shell. For example, the first retainer may directly retain the cable. The first retainer may be in contact with at least one of the first part, the second part, and the third part of the end face on the one side of the second direction of the first shell of any one of the above aspects.

The shield case of the invention may have no or at least one engaging arm and may have no or at least one first engaging hole. The at least one engaging arm, if provided, may be any arm extending in the second direction from one of the first and second shells of any one of the above aspects. The at least one first engaging hole of the invention, if provided, may be any hole in the other one of the first and second shells for engaging the associated engaging arm(s). For example, the engaging arm(s) of any one of the above aspects may engage with the first engaging hole(s) of any one of the above aspects from the outside or inside of the other shell.

The shield case of the invention may have no or at least one second engaging hole and may have no or at least one engaging projection. The at least one second engaging hole, if provided, may be any hole in one of the first and second shells of any one of the above aspects. The at least one engaging projection, if provided, may be any projection on the other one of the first and second shells of any one of the above aspects and can engage with the associated second engaging hole(s). For example, the engaging projection(s) of any one of the above aspects may engage with the second engaging hole(s) of any one of the above aspects from the inside or outside of the one shell. The third engaging hole and/or the leg of the shield case of the invention may be omitted.

The second retainer of the shield case of the invention may be omitted. If provided, the second retainer may be any tube (circular tube or polygonal tube) or half tube (half circular tube or half polygonal tube) for retaining the cable, the second retainer being provided on the half tube of the first shell of any one of the above aspects so as to be located on the one side of the second direction relative to the end face of the first shell. For example, the second retainer may be located on the one side of the second direction relative to the first retainer so as to allow both the first and second retainers to directly retain the cable. Alternatively, the second retainer may retain the first retainer that directly retains the cable.

The third retainer of the shield case of the invention may be omitted. If provided, the third retainer may be any tube (circular tube or polygonal tube) or half tube (half circular tube or half polygonal tube) for retaining the gasket of any one of the above aspects. The third retainer further has one of the following configurations: (1) The third retainer may be coupled to the first shell of any one of the above aspects and located on the one side of the second direction relative to the end face on the one side of the second direction of the first shell. In this case, the second retainer can be omitted. (2) Alternatively, the third retainer may be coupled to the second retainer and located on the one side of the second direction relative to the second retainer.

It should be appreciated that the plug connectors in the embodiments and variants thereof are described above by way of examples only. The materials, shapes, dimensions, numbers, arrangements, and other configurations of the constituents of the plug connectors may be modified in any manner if they can perform similar functions. The configurations of the embodiments and the variants described above may be combined in any possible manner. The first direction of the invention may be any direction in which to combine the first and second shells of any one of the above aspects. The second direction of the invention may be any direction orthogonal to the first direction. The third direction of the invention may be any direction crossing the first direction and the second direction.

REFERENCE SIGNS LIST

P: plug (plug connector)
100: terminal (connecting member)
110: middle portion
120: contact portion
130: connecting portion
200: housing
210: middle portion
220: distal portion
230: basal portion
231*a*: connecting groove 231b: connecting groove
232a: press-fit hole
232b: press-fit hole
240a: receiving hole
240b: receiving hole
300: cable
310: signal wire (signal transmission part)
311: core wire
312: inner insulator
320: outer insulator
400: molded member
500: gasket
510: fitting recess
600: spacer
610: engaging projection
620: guide projection
700: shield case
700a: first shell
710a: tube
720a: half tube
721a: end face (end face on one side of second direction)
721a1: first part
721a2: second part
721a3: third part
730a: engaging hole (first engaging hole)
740a: engaging projection
750a: leg
760a: coupling portion
700b: second shell
710b: shell body
720b: coupling portion
730b: engaging hole (second engaging hole)
740b: engaging hole
750b: engaging arm
700c: first retainer
700d: second retainer
700e: third retainer
700f: coupling portion

The invention claimed is:

1. A plug connector comprising:
a connecting member;
a cable including a signal transmission part, the signal transmission part being connected to the connecting member; and
a shield case including:
first and second shells, combined together in a first direction so as to form a tube at least partially covering the connecting member and the signal transmission part, the first shell having an end face on one side of a second direction, the second direction being orthogonal to the first direction, and
a first retainer being a tube or half tube for retaining the cable, the first retainer being provided on the second shell so as to be located on the one side of the second direction relative to the end face of the first shell and in direct physical contact with at least a part of the end face of the first shell.

2. The plug connector according to claim 1, wherein the first shell includes a half tube extending in the second direction,
the half tube of the first shell includes said end face, the end face including:
a first part on one side of the first direction;
a second part on one side of a third direction, the third direction being orthogonal to the first direction and the second direction; and
a third part on the other side of the third direction,
the second shell is a half tube or plate to be combined with the half tube of the first shell, and
the first retainer is in contact with at least one of the first part, the second part, or the third part.

3. The plug connector according to claim 1, wherein the shield case further includes:
an engaging arm extending in the second direction from one of the first and second shells, and
a first engaging hole in the other one of the first and second shells, the first engaging hole being configured to engage the engaging arm.

4. The plug connector according to claim 2, wherein the shield case further includes:
an engaging arm extending in the second direction from one of the first and second shells, and
a first engaging hole in the other one of the first and second shells, the first engaging hole being configured to engage the engaging arm.

5. The plug connector according to claim 2, wherein the shield case further includes:
a pair of engaging arms extending in the second direction from one of the first and second shells so as to be opposed to each other in the third direction, and
a pair of first engaging holes in the other one of the first and second shells, the first engaging holes being opposed to each other in the third direction, and
the engaging arms are configured to engage in the respective first engaging holes from outside of the other shell.

6. The plug connector according to claim 1, wherein the shield case further includes:
a second engaging hole in one of the first and second shells; and
an engaging projection on the other one of the first and second shells, the engaging projection being configured to engage in the second engaging hole.

7. The plug connector according to claim 2, wherein the shield case further includes:
a pair of second engaging holes in one of the first and second shells, the second engaging holes being opposed to each other in the third direction; and
a pair of engaging projections on the other one of the first and second shells, the engaging projections being opposed to each other in the third direction and configured to engage in the respective second engaging holes from the inside of the one shell.

8. The plug connector according to claim 5, wherein the shield case further includes:
a pair of second engaging holes in one of the first and second shells, the second engaging holes being opposed to each other in the third direction; and
a pair of engaging projections on the other one of the first and second shells, the engaging projections being opposed to each other in the third direction and configured to engage in the respective second engaging holes from the inside of the one shell.

9. The plug connector according to claim 1, wherein the shield case further includes a second retainer being a tube or half tube for retaining the cable, the second retainer being provided in the first shell so as to be located on the one side of the second direction relative to the end face of the first shell.

10. The plug connector according to claim 2, wherein the shield case further includes a second retainer being a tube or half tube for retaining the cable, the second retainer being provided in the first shell so as to be located on the one side of the second direction relative to the end face of the first shell.

11. The plug connector according to claim 9, wherein the first retainer retains the cable over the second retainer.

12. The plug connector according to claim 10, wherein the first retainer retains the cable over the second retainer.

13. The plug connector according to claim 1, further comprising a gasket of ring shape, wherein
the cable is inserted through and in intimate contact with the gasket, and
the shield case further includes a third retainer being a tube or half tube for retaining the gasket, the third retainer being coupled to the first shell so as to be located on the one side of the second direction relative to the end face of the first shell.

14. The plug connector according to claim 2, further comprising a gasket of ring shape, wherein
the cable is inserted through and in intimate contact with the gasket, and
the shield case further includes a third retainer being a tube or half tube for retaining the gasket, the third retainer being coupled to the first shell so as to be located on the one side of the second direction relative to the end face of the first shell.

15. The plug connector according to claim 9, further comprising a gasket of ring shape, wherein
the cable is inserted through and in intimate contact with the gasket, and
the shield case further includes a third retainer being a tube or half tube for retaining the gasket, the third retainer being coupled to the second retainer so as to be located on the one side of the second direction relative to the second retainer.

16. The plug connector according to claim 10, further comprising a gasket of ring shape, wherein
the cable is inserted through and in intimate contact with the gasket, and
the shield case further includes a third retainer being a tube or half tube for retaining the gasket, the third retainer being coupled to the second retainer so as to be located on the one side of the second direction relative to the second retainer.

17. The plug connector according to claim 11, further comprising a gasket of ring shape, wherein
the cable is inserted through and in intimate contact with the gasket, and
the shield case further includes a third retainer being a tube or half tube for retaining the gasket, the third retainer being coupled to the second retainer so as to be located on the one side of the second direction relative to the second retainer.

18. The plug connector according to claim 12, further comprising a gasket of ring shape, wherein
the cable is inserted through and in intimate contact with the gasket, and
the shield case further includes a third retainer being a tube or half tube for retaining the gasket, the third retainer being coupled to the second retainer so as to be located on the one side of the second direction relative to the second retainer.

19. The plug connector according to claim 1, further comprising a housing having an insulating property and holding the connecting member,
wherein the first and second shells at least partially cover the connecting member, the housing, and the signal transmission part.

20. The plug connector according to claim 2, further comprising a housing having an insulating property and holding the connecting member,
wherein the first and second shells at least partially cover the connecting member, the housing, and the signal transmission part.

\* \* \* \* \*